UNITED STATES PATENT OFFICE.

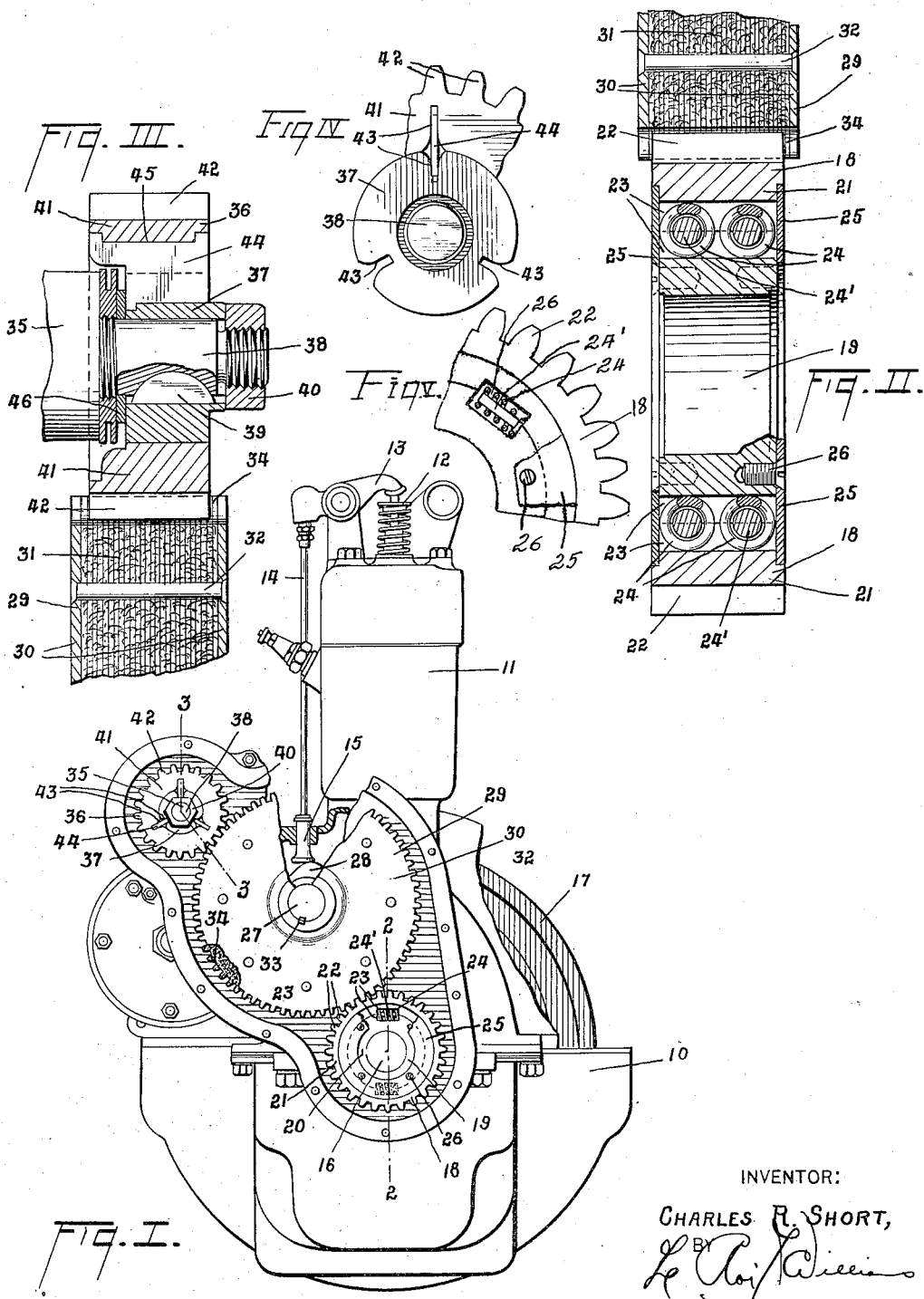

CHARLES R. SHORT, OF DETROIT, MICHIGAN, ASSIGNOR TO GENERAL MOTORS COMPANY, OF DETROIT, MICHIGAN, A CORPORATION OF NEW JERSEY.

HYDROCARBON-MOTOR.

1,375,067.  Specification of Letters Patent.  Patented Apr. 19, 1921.

Application filed June 11, 1917. Serial No. 174,168.

*To all whom it may concern:*

Be it known that I, CHARLES R. SHORT, a subject of the King of Great Britain, and resident of Detroit, Wayne county, State of Michigan, have invented certain new and useful Improvements in Hydrocarbon-Motors, of which the following is a specification.

This invention relates to hydrocarbon motors, and more particularly to improvements in gear drives, especially adapted for use therein.

The usual puppet valve motor is provided with a fly wheel on one end of the crank shaft and gearing at the other end, in mesh with a gear on a cam shaft for operating the valves. On account of the fact that the cam shaft carries a varying load, depending upon the relative positions of the cams to the valves, there is a tendency to set up a torsional vibration in the cam shaft which is carried back through the driving gears to the crank shaft. With the usual rigid connections between the crank and cam shafts, the gears are soon worn and the vibration is considerably amplified.

It has also been found that in motors having a fly wheel and transmission connected with one end of a very light multi-throw crank shaft, there is a tendency for the unloaded front end of the crank shaft to twist at intervals, relative to its rear end, and, of course, if gears are mounted at the front end of the crank shaft running with relatively light loads, the twisting action or vibration will set up a tendency to wear out the intermeshing gear teeth.

Under the conditions referred to, it is practically impossible to maintain non-metallic gears, made of fabric, leather or suitable composition for any considerable time without setting up serious noise and wear.

I have discovered that the difficulties referred to may be overcome by providing a yielding or spring coupling in the driving train for absorbing the vibrations and preventing their amplification. Therefore it will be seen that one of the objects of my invention is to provide means for minimizing the vibration set up in gear driving trains.

Another object of this invention is to provide a driving train comprising a non-metallic gear with a cushion coupling.

Another object is to improve the construction and operation of hydro-carbon motor puppet valve driving mechanisms.

These, and various other objects, will more clearly appear from the following description taken in connection with the accompanying drawings, which form a part of this specification, and in which:

Figure 1 is a front elevation of a hydrocarbon motor, with portions broken away, and a front cover removed for disclosing a gear driving train;

Fig. 2 is a transverse section through the crank shaft gear, substantially on the line 2—2 of Fig. 1, and a fragmentary section of a gear meshing therewith;

Fig. 3 is a transverse section substantially on the line 3—3 of Fig. 1, showing the gear on an accessory drive shaft, and a fragmentary section of a gear meshing therewith.

Fig. 4 is a fragmentary side elevation of the gear shown in full in Fig. 3, and

Fig. 5 is a view showing certain elements and features of my invention upon a larger scale than they are shown in Fig. 1.

Referring to the drawings, 10 is a motor crank case, on which is mounted a multi-cylinder block 11, each cylinder being provided with the usual overhead puppet valve member 12, adapted to be actuated by a rocker arm 13, push rod 14 and tappet 15.

A multi-throw crank shaft 16 is mounted in the crank case 10 with a fly wheel 17 secured to its rear end and a gear 18 preferably of metal, is arranged at its forward end. The gear 18 comprises an inner hub 19 preferably secured to the shaft 16 as by a key 20, and a rim portion or driving member 21 in the periphery of which are formed the driving teeth 22, is adapted to be loosely fitted on the hub member 19. The interior of the driving member 21 and the periphery of the inner hub 19 are formed at intervals around their contacting surfaces, with recesses or pockets 23 which are adapted to register and in which are inserted cushions or spiral springs 24.

In the illustrated embodiment there is inserted with each of the springs 24, a pin 24' the length of which is shorter than that of the pockets. This construction will permit a slight relative rotary movement between the inner and outer members 19 and 21 of gear 18, the movement being limited by the difference between the length of the limiting pins 24' and that of the notches 23 in which they are arranged. The members 19 and 21 are then maintained in operative relation by arranging at their respective sides, clamping plates 25 which are adapted to be secured to the inner hub member 19 as by screws 26. It will be understood therefore, that there is a sliding connection between the periphery of the plates 25 and the member 21 when there is any relative movement between this member and the member 19.

A shaft 27 is suitably mounted in the crank case, in parallel relation to the crank shaft 16 and is provided with cams 28 which are adapted to operate puppet valve members 15. A gear 29 is secured to the forward end of the cam shaft 27 in mesh with and adapted to be driven by the crank shaft gear 18. The gear 29 is preferably non-metallic, formed of either raw-hide, fabric or suitable compositions, and of any well known construction. It is illustrated as comprising a pair of plates 30 between which are arranged laminations 31 of the desired non-metallic material. The entire structure being clamped together as by rivets 32 and secured to the cam shaft as by a key 33. The driving connection between the gears 18 and 29 is through the non-metallic teeth 34, which are formed in the laminations 31.

A third shaft 35 for driving an accessory such as an electric generator is mounted in the crank case 10, parallel to the other shafts, with a gear 36 mounted on its forward end in mesh with the teeth 34 of the gear 29. The gear 36 comprises a hub member 37 which is secured against rotation on the contracted end 38 of the shaft 35 as by a key 39 and a retaining nut 40, and an outer member 41 is provided in the periphery of which are formed teeth 42 in mesh with the teeth of the gear 29 as described. The outer member 41 is adapted to be loosely fitted on the periphery of the inner member 37. The members 37 and 41 are formed on their adjacent surfaces with notches 43 in which the opposite ends of three radially arranged leaf springs 44 are secured.

The springs 44 are adapted to be inserted in position in the outer member 41 before it is mounted in position, and are connected thereto by the tongue and groove joints 45. Then the springs may be fitted on the inner hub 37, and all of these parts finally secured in position on the shaft 35 by the retaining nut 40 and the clamping collar 46.

Referring particularly to Fig. 5, which illustrates a modified form of the construction shown in Fig. 4, it will be noted that one face of the outer member 41 of the gear is formed with a recess 47. A flexible collar 48, preferably of leather, is adapted to be inserted in the recess with a plurality of pins 49, connecting its inner portion with the inner member 37 and another set of pins 50, connecting its outer portion with the outer member 41, providing a yielding drive between the driving and driven members of the gear. A clamping collar may then be arranged between the gear and the nut 40, for locking the parts together.

Thus it will be seen that with this arrangement, I have provided metallic gears in mesh with a non-metallic gear and connected through cushion couplings to their respective shafts.

While I have described and will specifically claim what I deem to be preferred forms of my invention and their adaptations, it will be obvious to those skilled in the art that various modifications and changes may be made without departing from the spirit and scope hereof.

Having thus described my invention, what I claim and desire to secure by Letters Patent is:

1. In an internal combustion engine, a crank shaft; a valve operating shaft; a gear carried by said crank shaft and comprising a hub portion secured thereto and provided with a recess, a rim portion surrounding said hub portion and provided with a recess adapted to register with the recess in said hub portion, a coil spring located within said recesses and through which one of said gear portions is driven from the other, a pin located within said spring and the ends of which are adapted to engage the end walls of said recesses to thereby limit the extent of relative movement between said hub and rim portions permitted by said spring, and two annular clamping plates secured to said hub portion one upon each side thereof and which clamping plates extend over the recesses aforesaid and the peripheries of which engage the sides of said rim portion to thereby prevent lateral movement thereof; and a second gear carried by said valve operating shaft and with which said first mentioned gear is in mesh.

2. In an internal combustion engine, a crank shaft; a valve operating shaft; a gear carried by one of said shafts and comprising a hub portion secured thereto and provided with a recess, a rim portion surrounding said hub portion and provided with a recess adapted to register with the recess in said hub portion, two clamping plates located one upon each side of the gear and which clamping plates are secured to one of the portions aforesaid and extend and overlie the other portion to thereby prevent sidewise movement of said portions, a coil spring located within said recesses and through which one of said gear portions is driven from the other, and a pin located within said spring and the ends of which are adapted to engage the end walls of said recesses to thereby limit the extent of relative movement between said hub and rim portions permitted by said spring; and a second gear carried by the other of said shafts and with which said first mentioned gear is in mesh.

3. A yieldable gear comprising a hub portion provided with a recess; a rim portion surrounding said hub portion and provided with a recess arranged to register with the recess within said hub portion; a coil spring located within said recesses and through which one of said gear portions is driven from the other; a pin located within said spring and the ends of which are adapted to engage the end walls of said recesses to thereby limit the movement of said hub and rim portions relative to one-another; and two clamping plates located one upon each side of said hub and rim portions and adapted to prevent sidewise movement of said portions relative to one another.

4. A yieldable gear comprising a hub portion provided with a recess; a rim portion surrounding said hub portion and provided with a recess arranged to register with the recess in said hub; two annular clamping plates located one upon each side of said gear and extending over the recesses aforesaid and adapted to prevent lateral movement of said gear portions relative to one another; a spring located within said recesses and through which one of said gear portions is driven from the other; and means other than said spring for limiting the extent of relative movement between said hub and rim portions permitted by said spring.

In testimony whereof I affix my signature.

CHARLES R. SHORT.